April 7, 1942.    N. M. RUST ET AL    2,278,801
BAND PASS FILTER
Filed Oct. 1, 1940    8 Sheets-Sheet 1

INVENTORS
N. M. RUST
J. D. BRAILSFORD
E. F. GOODENOUGH
ATTORNEY

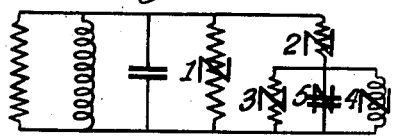
Fig. 3.
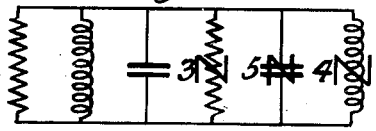
Fig. 4.
Fig. 5.
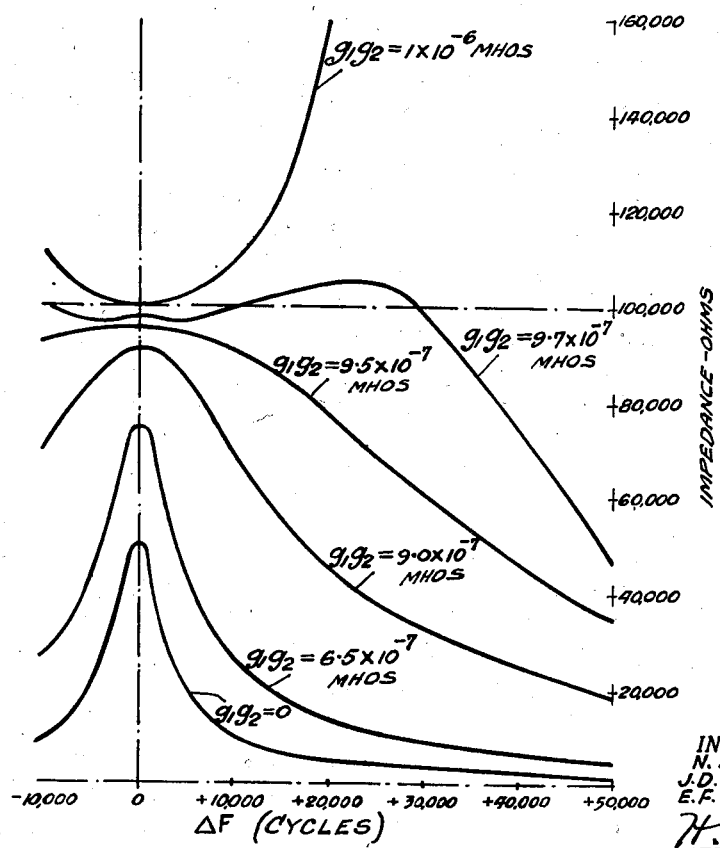

INVENTORS
N. M. RUST
J. D. BRAILSFORD
E. F. GOODENOUGH
ATTORNEY

April 7, 1942.   N. M. RUST ET AL   2,278,801
BAND PASS FILTER
Filed Oct. 1, 1940   8 Sheets-Sheet 5
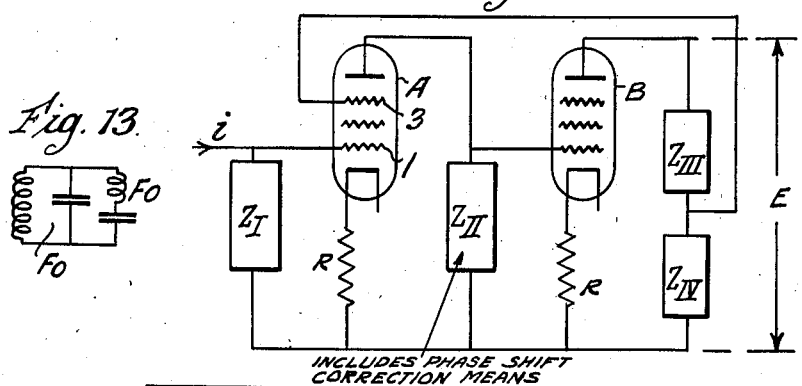
Fig. 13.
Fig. 14.
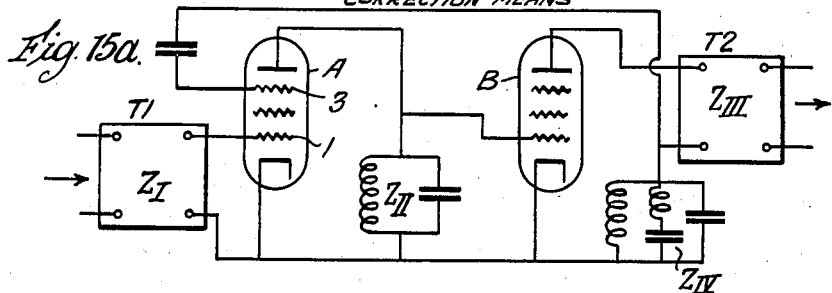
Fig. 15a.
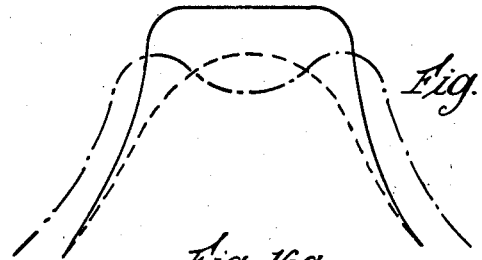
Fig. 15b.
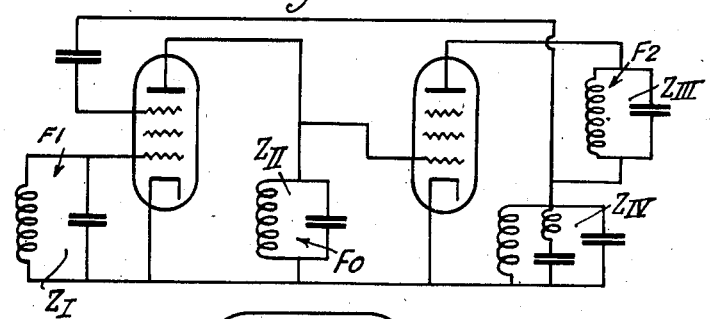
Fig. 16a.
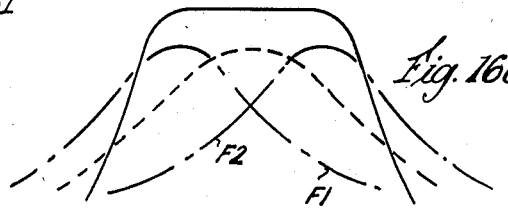
Fig. 16b.
INVENTORS
N. M. RUST
J. D. BRAILSFORD
E. F. GOODENOUGH
ATTORNEY April 7, 1942.   N. M. RUST ET AL   2,278,801
BAND PASS FILTER
Filed Oct. 1, 1940   8 Sheets-Sheet 6
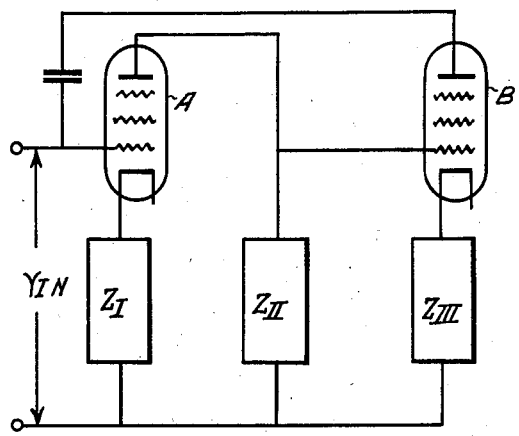
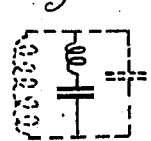
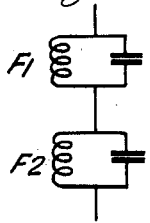
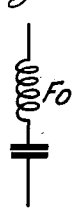
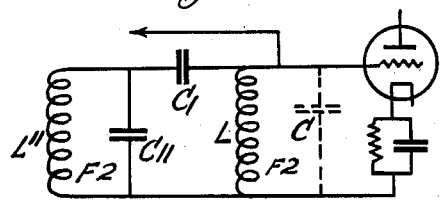
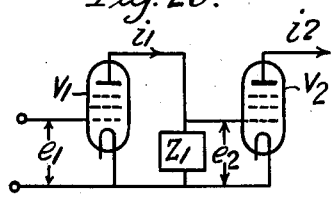
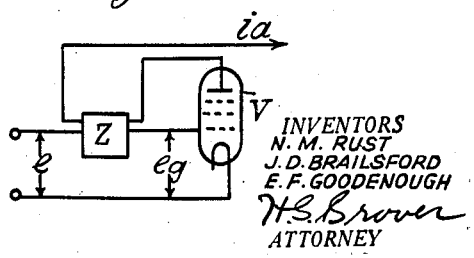
INVENTORS
N. M. RUST
J. D. BRAILSFORD
E. F. GOODENOUGH
ATTORNEY

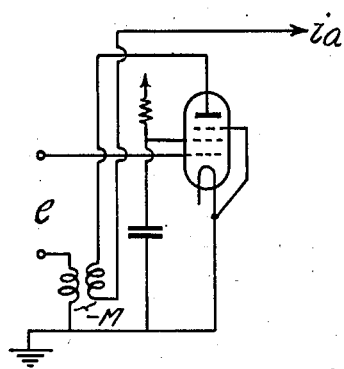
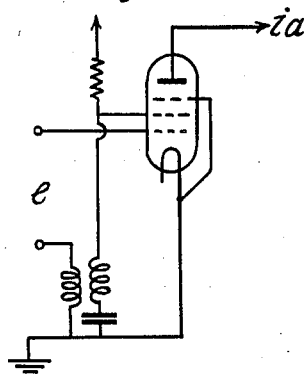
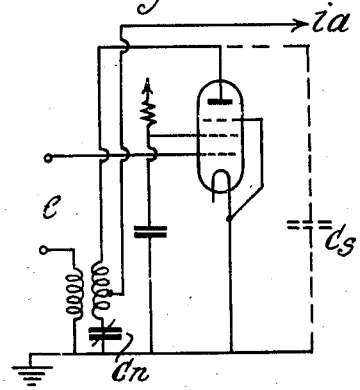
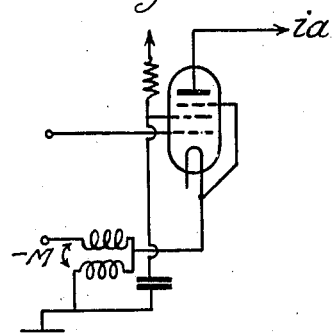
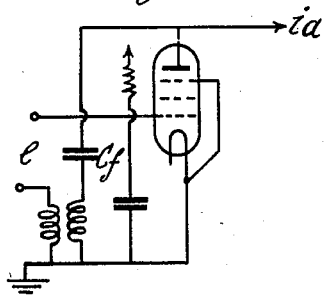
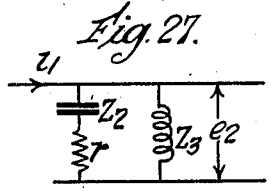
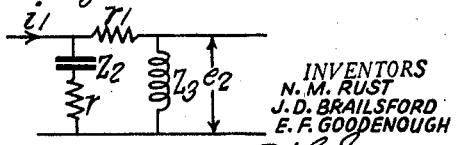
INVENTORS
N. M. RUST
J. D. BRAILSFORD
E. F. GOODENOUGH
ATTORNEY April 7, 1942.  N. M. RUST ET AL  2,278,801
BAND PASS FILTER
Filed Oct. 1, 1940  8 Sheets-Sheet 8

INVENTORS
N. M. RUST
J. D. BRAILSFORD
E. F. GOODENOUGH
ATTORNEY

Patented Apr. 7, 1942

2,278,801

UNITED STATES PATENT OFFICE 2,278,801

BAND PASS FILTER

Noël Meyer Rust, Chelmsford, Joseph Douglas Brailsford, London, and Ernest Frederick Goodenough, Springfield, Chelmsford, England, assignors to Radio Corporation of America, a corporation of Delaware Application October 1, 1940, Serial No. 359,182
In Great Britain June 8, 1939

13 Claims. (Cl. 179—171)

This invention relates to band pass filters and has for its object to provide improved filters which are comparatively flexible in design and will facilitate the production of (1) wide band amplifiers of high gain and large signal-to-noise ratio (2) narrow band amplifiers of great selectivity and with a flat topped response curve such as will give a good signal-to-noise ratio or (3) variable selectivity amplifiers in which selectivity and fidelity can be readily adjusted in accordance with the operating conditions at the time. Though not limited to its application thereto the primary applications of the invention are to television amplifiers and to intermediate frequency amplifiers for broadcast and like receivers.

According to this invention a band pass filter effect is obtained by superimposing upon the frequency-impedance characteristics of one network, the frequency-impedance characteristic of at least one further network which is coupled to the first in such manner that the impedance elements in the second network are, in effect, reversed. In other words, there are employed, in accordance with this invention, two networks coupled together in such manner that the second network acts as though it were directly included in and were part of the first network but with its impedance elements reversed. The expression "reversed" as employed in this specification and in the claims, is used with a somewhat special meaning which will be explained hereinafter.

Figure 1:
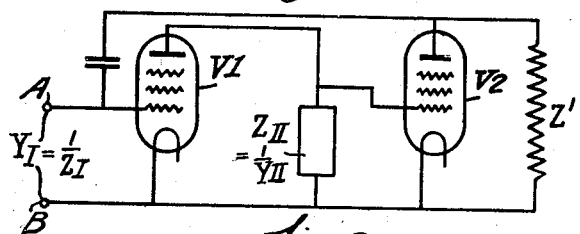
Figure 2:
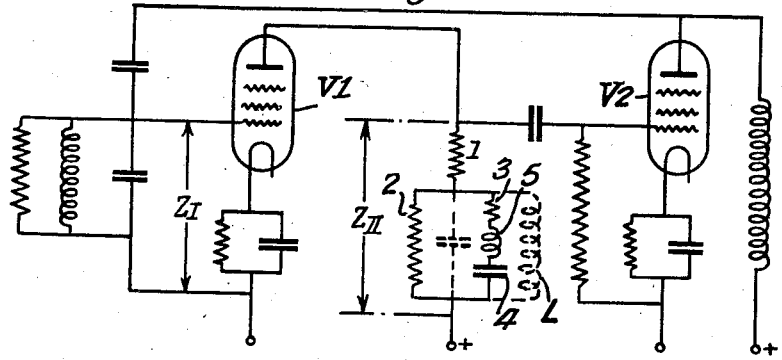
Figure 12:
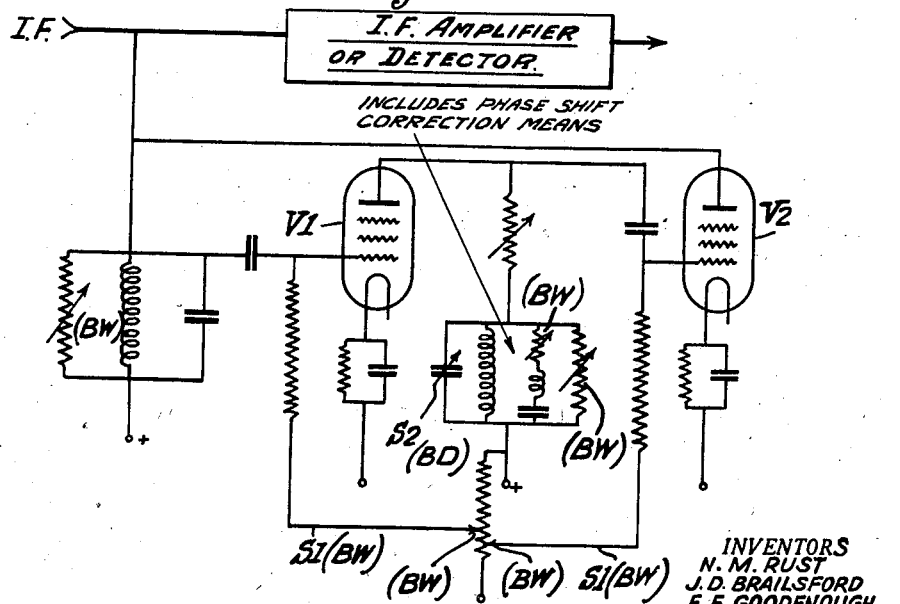
Figure 6:
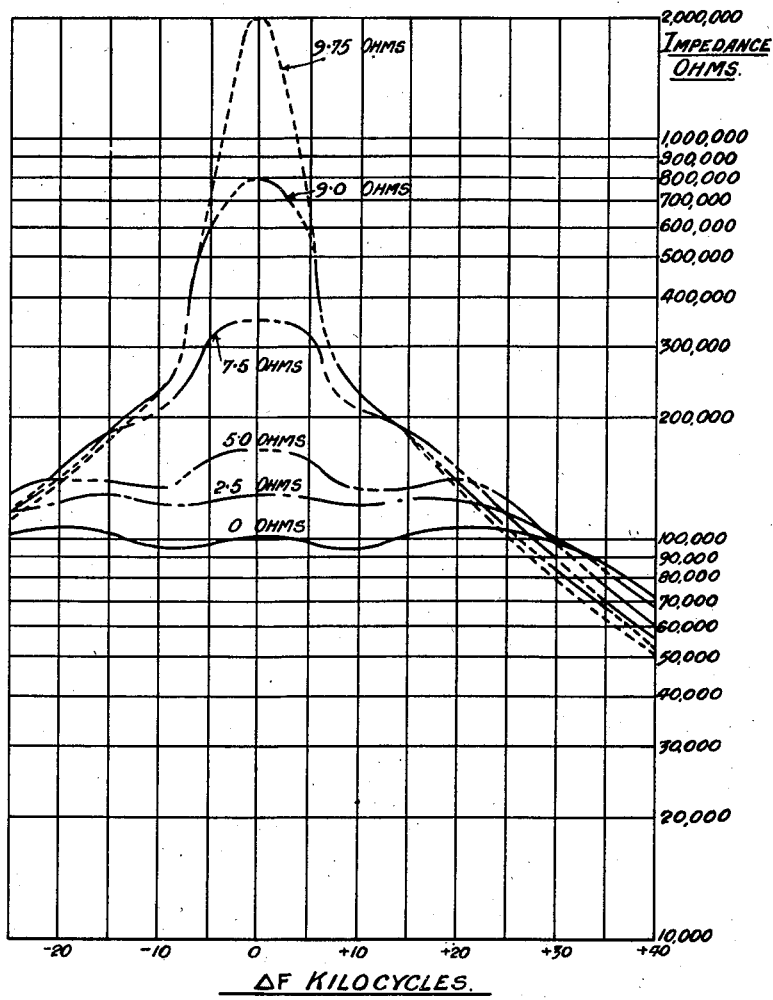
Figure 8:
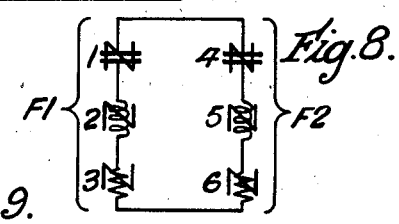
Figure 9:
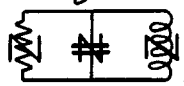
Figure 10:
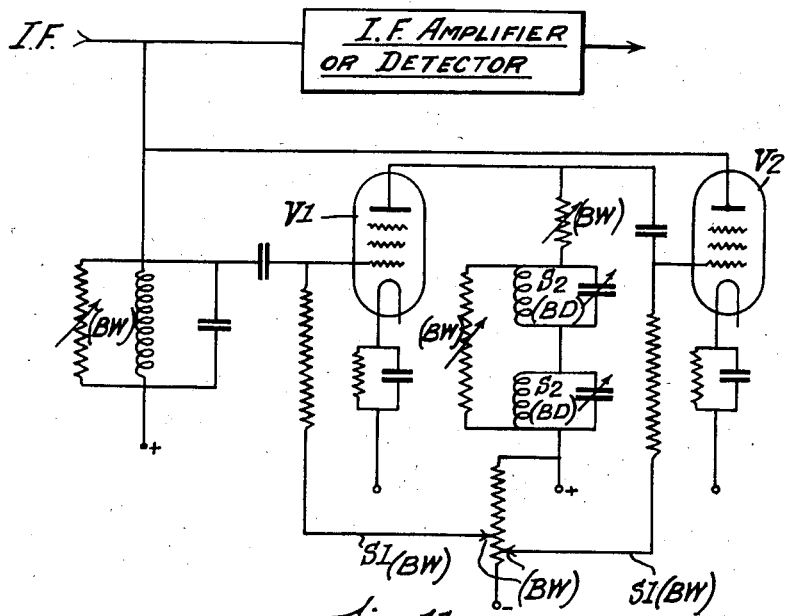
Figure 11:
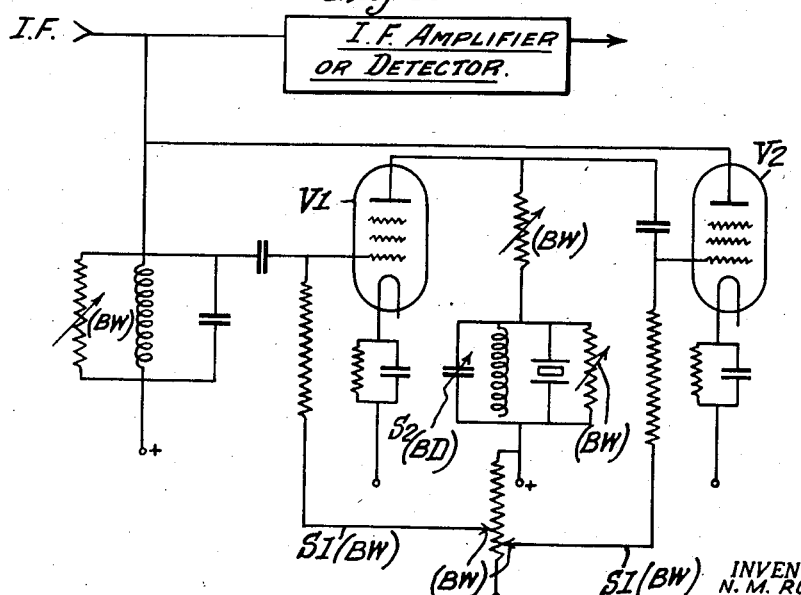
Figure 29:
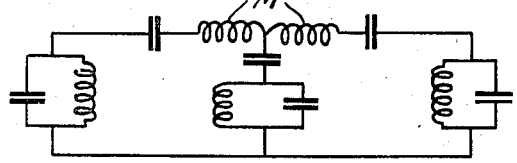
Figure 30:
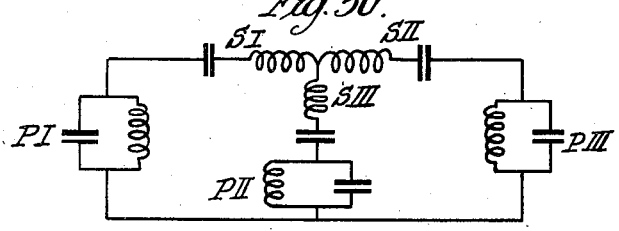
Figure 31:
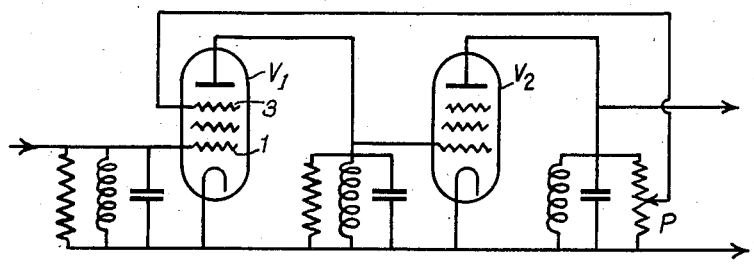
Figure 32:
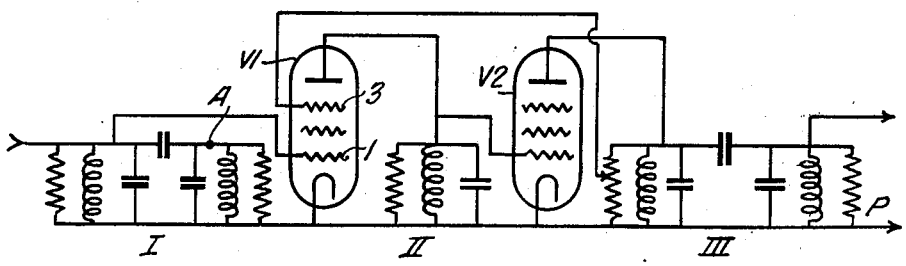

The invention is illustrated in and explained in connection with the drawings which accompany the present specification, wherein Fig. 1 is a circuit in diagrammatic form which serves to explain certain aspects of the invention; Fig. 2 shows a wide band high gain amplifier circuit in accordance with the invention; Fig. 3 shows the equivalent grid circuit impedance of the first valve of Fig. 2; Fig. 4 is a second equivalent circuit under certain conditions; Figs. 5 and 6 are frequency-impedance characteristics obtained from the circuit of Fig. 2; Figs. 7, 8, 9 and 13 are circuit elements which serve to explain the invention as applied to narrow band, highly selective band-pass filters; Figs. 10, 11 and 12 are various embodiments of impedance modifying networks associated with the IF amplifier chain of a superheterodyne receiver for effecting variable selectivity; Fig. 14 represents in diagrammatic fashion the embodiment within the IF amplifier chain of impedance modifying networks; Figs. 15a and 16a illustrate two practical circuits involving the principles of Fig. 14; Figs. 15b and 16b are frequently response curves obtained with the circuits of Figs. 15a and 16a, respectively; Fig. 17 shows the addition of inverse feed-back to an amplifier according to the invention; Figs. 18a, 18b, 18c and 19 are circuits serving to explain the utilization of stray capacities present in television carrier or intermediate frequency circuits; Figs. 20 and 21 serve to explain certain methods of overcoming phase shift between the output and input voltages of a high frequency amplifier; Figs. 22 to 26 show practical circuit arrangements for compensating for phase shift; Figs. 27, 28 and 29 show networks that may constitute the coupling impedance $Z_1$ of Fig. 20; Fig. 30 is a circuit equivalent to that of Fig. 29; and Figs. 31 and 32 are circuits according to the invention disclosing certain modifications.

In order that the invention may be the better understood there will first be given a brief and simplified description of the phenomena upon which the invention is based.

Consider first a circuit as shown in Figure 1, which is an explanatory diagrammatic figure. In this circuit there are two valves V1, V2, the plate of the first of which is coupled to the grid of the second by an impedance of valve $Z_{II}$ which is equal to $$\frac{1}{Y_{II}}$$

where $Y_{II}$ is the corresponding admittance. The effective admittance appearing across the terminals AB of Figure 1, due to the action of the circuit, is taken as $Y_I$ which is equal to $$\frac{1}{Z_I}$$

where $Z_I$ is the corresponding impedance. The anode of the second valve is capacity coupled to the grid of the first. The extrenal plate impedance $Z'$ of the second valve is very large as compared to $Z_I$.

Neglecting effects due to stray couplings and the like, then $$Y_I = -g_1 g_2 Z_{II}$$

or $$Z_I = -\frac{1}{g_1 g_2} Y_{II}$$

where $g_1$ and $g_2$ are the mutual conductances of the first and second valves respectively. The relationships above set forth may be summarised as a theorem thus: the admittance thrown back to the terminals A B (see Figure 1) follows the same law of variation with frequency as the impedance at the grid of the second valve but is reversed in sign. The impedance thrown across A, B, although negative, does not follow the same law as the impedance $Z_{II}$ but follows the same law as its reciprocal $Y_{II}$. In other words the impedance $Z_{II}$ is in effect inverted and also reversed in sign. The term "reversed" as employed in this specification is meant to indicate that the impedance acted upon in this manner is at all frequencies proportionate to that of its "potentially inverse arm" (see p. 131 "Transmission Networks and Filters" by R. E. Shea, 1929)

but is also of opposite sign. The term is specially applied to mean both inversion and reversal of sign. With such reversal action therefore, the network acted upon is, in effect, equivalent to one which has been derived by the well known rules for determining potentially inverse networks the impedance of which however is of opposite sign. Thus a number of elements, or groups of elements, which are in series or parallel in the grid circuit of V2 would appear as a corresponding number in parallel or series in the grid circuit of V1. Moreover, wherever in the grid circuit of V2 an inductance or capacity is used, it may be considered as acting as a negative capacity or inductance in the grid circuit of V1.

Hence the action of any compound circuit may be derived by regarding each element or group of elements in the above manner, i. e. parallel elements or groups of elements appear as series (and vice versa), inductance as capacity (and vice versa) and resistance as resistance, the sign of the impedance of the equivalent network being reversed.

The present invention utilises the above described phenomena to enable the characteristics of a tuned circuit or other network to be improved in desired manner by superimposing thereon characteristics provided by a reversed second network.

Figure 2 shows a wide band high gain amplifier in accordance with this invention. This amplifier comprises two valves V1, V2, a parallel tuned circuit in the grid circuit of the first valve and a network consisting of resistance 1, 2, 3, a capacity 4, and an inductance 5, connected as shown in the grid circuit of the second valve. The grid circuit impedance of the first valve is marked $Z_I$ and that of the second valve $Z_{II}$. The anode of valve V2 is capacity coupled back to the grid of V1. With this arrangement the network $Z_{II}$ is in effect reversed and the reversed equivalent included in the net work $Z_I$ so that the equivalent grid circuit impedance of the first valve may be represented as shown in Figure 3. In Figure 3 the references 1, 2, 3, 4, and 5 correspond to the similarly numbered references in Figure 2, and the letters N, superimposed upon the various circuit elements in Figure 3, indicate that those elements are negative. Thus 4N is the negative inductance obtained by reversing capacity 4 of Figure 2. If the resistance element 2 of Figure 2 be made much greater than the resistance element 3, then in the reversed impedance network of Figure 3, 2N will be very much smaller than the impedance of the parallel combination 3N, 4N, 5N, with which it is in series and may be neglected so that the approximate circuit equivalent is as shown in Figure 4. It will be directly seen from Figure 4 that it is possible, by correct choice of circuit constants and suitable adjustment of the operating parameters of the valves V1 and V2 (Figure 2) to make the reversed element 4N of Figure 4 neutralise the positive inductance in that figure, the reversed element 5N neutralise the positive capacity and to make the negative resistance 3N compensate for the positive resistance or, applying these remarks to Figure 2, the element 4 in $Z_{II}$ can by "reversal" be made to neutralise the inductance in $Z_I$, the element 5 in $Z_{II}$ by "reversal" to neutralise the capacity in $Z_I$, and the resistance 3 in $Z_{II}$ to compensate to an extent determined by considerations of stability for the resistance in $Z_I$. As the effect of a negative resistance in parallel with a positive resistance is to raise the impedance, the result is achieved that over a range of frequencies dependent upon the relation of the elements 2 and 3 in Figure 2 a substantially constant over-all impedance is obtained. By incorporating such an arrangement in an amplifier circuit a level response curve for this range of frequencies can be obtained. At a frequency outside the constant impedance range, where the impedance of the circuit 3, 4, 5, (Figure 2) becomes comparable with that of resistance 2 (Figure 2) the reversed element 2N begins to take effect, the compensating action is destroyed, the net or overall impedance changes and ultimately falls to a low value. Variation of the value of resistance 1 varies both the overall impedance and the band width, i. e. the range of frequencies over which the impedance remains substantially constant.

The results achieved in an experimentally tested case are represented graphically in the accompanying Figures 5 and 6. In Figure 5 impedance is plotted along the ordinate line against frequency in cycles per second. The mid-band frequency is marked O, $\Delta F$ representing changes in frequency away from the mid-band frequency. The curves are drawn for different values of the product $g1$ and $g2$ in mhos, these values being marked on the respective curves. $g1$ and $g2$ are equal to one another and each is equal to 1 milliampere per volt for the curve marked $$g1g2 = 1 \times 10^{-6}.$$

The mid-band frequency was 450 kc. The curves of Figure 5 show the very wide range of variation of characteristic which can be obtained by varying the gain of the valves, and it will be noted that as the product $g1$ and $g2$ is raised, the impedance at the mid-band frequency rises and the curves broaden out until at some value between $9.5 \times 10^{-7}$ and $9.7 \times 10^{-7}$ the impedance remains practically constant over a range of approximately $\pm 25$ kc. For values of the product of $g1$ and $g2$ above $9.7 \times 10^{-7}$ the curves exhibit increasingly "double-humped" shapes. The curves of Figure 6 show the effects obtained by varying the series resistance 1 of Figure 2, these curves being taken for a value of the product of $g1$ and $g2$ equal to $9.7 \times 10^{-7}$ mhos. It will be seen from Figure 6, in which the values of resistance 1 of Figure 2 are marked on the respective curves, that as this resistance 1 is increased, the impedance is increased and the band width is decreased.

Resistance 2 may also be made variable to control the band width, the effect obtained being that, in general, the bigger this resistance 2 the greater the band width. A practical limit is set at which stray capacity across the resistance 2 produces asymmetry of characteristic. This, however, may be countered by tuning-out such stray capacity with a parallel inductance. Such a parallel inductance is shown in broken lines in Figure 2 at L, the stray capacity being also shown in broken lines.

Figure 7:
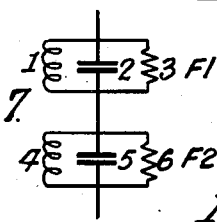

The same general principles above described as employed to provide improved wide band pass amplifiers in accordance with this invention, may be employed to provide narrow band highly selective band pass filters with flat topped and steeply sided characteristics. In such an embodiment there is employed in the network to be reversed, two (or, if desired, in a more complex case, more than two) tuned circuits resonant, depending on the circuit employed, either at the mid-band frequency or respectively at two frequencies closely adjacent and symmetrically disposed on either side of the mid-band frequency. There may be included in the plate circuit of the first valve and as shown in Figure 13, a parallel tuned circuit in parallel with a series tuned circuit both circuits being resonant at the midband frequency $f_0$. Again the equivalent of the network just described may be employed, this equivalent comprising as shown in Figure 7 two parallel tuned circuits in series with one another and resonant respectively above and below the mid-band frequency at the desired cut-off frequencies. In the network of Figure 7 one circuit is resonant at one cut-off frequency F1 and the other at the other F2, the said frequencies F1 and F2 being closely adjacent and symmetrically disposed on either side of the desired mid-band frequency $F_0$. The reversed form of the network of Figure 7 is shown in Figure 8. In Figures 7 and 8 the various elements are identified by the numbers marked thereon, the same convention of a superimposed N being employed to indicate reversal as in Figures 3 and 4. At about the mid-band frequency ($F_0$) the arrangement acts like a negative parallel resonant circuit as represented in Figure 9 and can be made, therefore, to produce compensating action resulting in a flat top to the characteristic. As the frequencies F1 and F2 are approached and passed through, the impedance changes become very rapid and sharp cut-offs are obtained.

In practice either series connected parallel tuned circuits (Figure 7) resonant respectively at F1 and F2 or a parallel tuned circuit and a series tuned circuit both resonant at $F_0$ and in parallel with one another (Figure 13) may be used, it being a matter of convenience which arrangement is adopted in any particular case.

It will be appreciated that the parallel tuned circuit and series resonant circuit in parallel with one another as in Figure 13, and resonant at the same frequency is the equivalent of a quartz crystal neutralised with a parallel resonant circuit, i. e. a quartz crystal connected across a parallel tuned circuit both crystal and circuit being resonant at the same frequency $F_0$. Accordingly, where desired, a narrow band pass filter effect can be obtained by using a crystal network as just described, as the network which is to be reversed.

Variable selectivity can be obtained by providing for variation either manually or automatically of the different elements in the circuit. As already stated with reference to Figure 2 the resistance 1 may be varied but other elements may be arranged for variation either automatically or manually. The various possibilities of variation are indicated diagrammatically in the accompanying Figures 10, 11, and 12, and, if desired, several of these may be used in any one case.

Figures 10 and 12 represent embodiments wherein ordinary circuit elements make up the network which is to be reversed, while Figure 11 shows an embodiment in which a crystal is included in said network which is to be reversed.

In Figures 10, 11, and 12, which show arrangements suitable for use in intermediate frequency amplifiers, the arrows and narrow heads associated with elements indicate manual controls which may be provided; the leads S1 represent leads upon which there may be superimposed, for automatic control purposes, voltages derived in well known manner in dependence upon incoming (desired) carrier strength; while the references S2 shown beside variable condensers, indicate that these condensers may, if desired, be arranged to be automatically varied (in known manner by means of a discriminator circuit) in dependence upon the amount of interference present at any time. The letters BW in brackets indicate that the controls in question influence band width, and the letters BD in brackets indicate that the controls in question displace the band in relation to interference.

Although in the specific arrangements hereinbefore described, two-valve circuits are described, the invention is not limited to such circuits for the essential feature thereof, namely the obtaining of the necessary reversal effects, can be carried into practice by means of circuits employing other numbers of valves, e. g. single valve circuits.

From the point of view of the amplifier chain, the apparatus shown in Figures 10, 11, and 12, including the two valves V1 and V2 are additional to the amplifier chain and serve as coupling elements in the amplifier chain. This is indicated by the arrows marked IF in these figures. The function of the valves V1 and V2 in the arrangments of Figures 10, 11, and 12 is to modify the impedance connected in the grid of valve V1 to have certain desired characteristics. Thus an impedance $Z_I$ becomes effectively $$\frac{1}{\frac{1}{Z_I} - g_1 g_2 Z_{II}} \quad (I)$$

As will be apparent from what follows, it is possible to produce such an impedance within the amplifier chain itself, that is without the additional valves V1 and V2. Figure 14 of the accompanying drawings illustrates such an amplifier chain wherein the impedance $Z_{II}$ is modified by means of the impedance $Z_{IV}$ and the grid 3 of valve A.

Defining the ratio $$\frac{E}{i}$$

as $Z'$ (a transfer impedance) it may be shown that $$Z' = \frac{E}{i} = \frac{g_{A1} Z_I (Z_{III} + Z_{IV})}{\frac{1}{g_B Z_{II}} - g_{A3} Z_{IV}} \quad (II)$$

which may be rewritten $$Z' = \frac{g_{A1} g_B Z_I (Z_{III} + Z_{IV})}{\frac{1}{Z_{II}} - g_B g_{A3} Z_{IV}} \quad (III)$$

The denominator of Expression III is similar to that of Expression I and may be considered as the effective admittance of the coupling between valves A and B, that is the reversed characteristic of $Z_{IV}$ is superimposed on $Z_{II}$. The resulting characteristic is designed to correct that of $Z_I Z_{III}$ (neglecting $Z_{IV}$ in comparison with $Z_{III}$). By making $Z_{IV}$ a series resonant circuit and $Z_{II}$ a parallel resonant circuit and by correctly relating $g_B$ to $g_{A3}$ and the Q's of the circuits, $$\frac{1}{g_B Z_{II}}$$

can be made slightly bigger than $-g_{A3} Z_{IV}$ at the resonant frequency and the value of $$\frac{1}{g_B Z_{II}} - g_{A3} Z_{IV}$$

or $$\frac{1}{g_B} Y_{II} - g_{A3} Z_{IV}$$

can be made to hold constant, or to increase, on moving from the resonant frequency as may be required. The feedback action of $Z_{IV}$ on to the third grid of valve A can therefore be regarded as a compensating action, which can be used to flatten out the response curve over a band of frequencies: it can virtually make $Z_{II}$ aperiodic and at the same time raise its impedance, or it can make it of any required low Q to obtain a required correction and of high impedance instead of low impedance.

Figures 15a and 16a illustrate two useful circuits involving the above principles.

In the arrangement of Figure 15a the wide band transformers T1 and T2 (which can conveniently be of the back-to-back tapered line type and which respectively incorporate $Z_I$ and $Z_{III}$) can be adjusted to give "flat top" response, or "double hump" response, the compensating arrangement provided by the superimposition of $Z_{IV}$ (reversed) onto $Z_I$ filling in the curve and at the same time allowing high gain in the intercoupling stage to be used as shown in Figure 15b wherein the shape of the response due to the wide band transformers is shown by the dot and dash line, the shape due to the high gain compensated stage is shown by the dash line, and the overall result by the full line.

In the arrangement of Figure 16a the tunings of the input circuit $Z_I$ and output circuit $Z_{III}$ tunings are staggered above and below the intermediate frequency $F_0$ so as to produce a gentle double humped curve. The middle circuit $Z_{II}$ tuned to $F_0$ is a high gain compensated circuit effectively producing the low Q correction required.

Figure 16b shows the characteristics for the various parts of Figure 16a, the characteristics for the input and output circuits respectively at frequencies $F_1$ and $F_2$ being shown by the dot and dash lines $F_1$ and $F_2$ respectively, the shape due to the high gain compensated stage is shown by the dash line, and the overall result by the full line.

It has been recognized from general considerations, and from experimental evidence, that positive feedback multi-valve arrangements in which negative feedback is introduced either stage by stage or "overall," possess advantages as regards stability, smoothness of adjustment, reproducibility, and so forth, and negative feed back can be applied with advantage to any of the reversed impedance circuits disclosed above. In Fig. 14 for example, negative feedback is obtained by means of the unbypassed cathode resistance R for the tubes A and B.

It may easily be shown that the input impedance $Y_{IN}$ of the arrangement illustrated in Figure 17 is given by the equation $$Y_{IN} = \frac{-g_A g_B Z_{II}}{(1+g_A Z_I)(1+g_B Z_{III})}$$

Putting $Z_I$ and $Z_{III}$ each to zero, i. e. with no cathode back coupling, this becomes the familiar $$Y_{IN} = -g_A g_B Z_{II}$$

If on the other hand cathode back coupling be introduced to the extent that the terms $g_A Z_I$ and $g_B Z_{III}$ are each >>1; the expression becomes $$Y_{IN} = \frac{-g_A g_B Z_{II}}{g_A g_B Z_I Z_{III}} = \frac{-Z_{II}}{Z_I Z_{III}}$$

That is, by the choice of suitable values for $Z_I$ and $Z_{III}$ in relation to $g_A$ and $g_B$, it is possible to produce a negative admittance at the input terminals of a value which is dependent upon the impedances $Z_I$, $Z_{II}$ and $Z_{III}$ and practically independent of the constants $g_A$ and $g_B$ of the valves. When $Z_I$ and $Z_{III}$ are circuits of very low Q, it will be seen that the variation of $Y_{IN}$ over a band of frequencies will be practically dependent upon the variation of $Z_{II}$. If $Z_{II}$ be a series circuit, it can therefore be used to compensate a parallel circuit placed across the input terminals as it will be "reversed": the reversal effect will however become more and more independent of the constants of the valves as $g_A Z_I$ and $g_B Z_{III}$ are made bigger and bigger compared with unity. If $Z_I$, $Z_{II}$ and $_{III}$ are each constituted as parallel resonant circuits and are of equal Q values and if $Z_{II}$ is made equal to $kZ_I$, $Z_{III}$ being made equal to $Z_I$ (still assuming $g_A Z_I$ and $g_B Z_{III} >> 1$) then $$Y_{IN} = -\frac{kZ_I}{(Z_I)^2} = \frac{-k}{Z_I}$$

or $$Z_{IN} = \frac{-Z_I}{k}$$

It will be seen therefore that the compensation of a parallel tuned circuit placed across the input terminals can be effected by means of three parallel resonant circuits, and, by the correct choice of values, valve constants can be eliminated.

In applying "reversed impedance" technique to television carrier frequencies, it becomes important to use the form of circuit best adapted to "lump-in" stray capacities. The fundamental circuit is, in effect, the full line circuit as shown in Figure 18a giving the correction over the region of frequencies required, whilst the dotted line circuit may be regarded both as a means of producing a cut-off action defining the sides of the resonance curve and of "tuning out" stray capacity. The circuit of Figure 18a is equivalent to that of Figure 18b acting as Figure 18c about the mid-band $F_0$.

For wide bands such as for a television spectrum, either at carrier frequency or at an intermediate frequency, it is required to make the impedance at frequency $F_0$ of the equivalent series circuit as high as possible, and at the same time remove frequencies $F_1$ and $F_2$ as far away as possible from $F_0$.

It has been found that the form of circuit illustrated in Figure 19, which again is equivalent to the fundamental circuit, produces the best results when stray capacity is the circuit limitation.

In this circuit the stray capacity C is made to tune with a coil L to the frequency $F_2$ (the higher frequency) and a relatively "tight" capacity coupling couples the parallel circuit so constituted to a circuit of the same constants tuned to the same frequency $F_2$.

To produce the requisite separation between $F_1$ and $F_2$ for a 10 megacycle I. F. for the television side band spread, condenser $C_1$ has to be of the order of twenty times that required to produce critical coupling. It is of course obvious that the bigger the value of $C_1$ the smaller is the coupling reactance, the tighter the coupling, and the bigger the separation between the equivalent frequencies $F_1$ and $F_2$.

In the application of feed back to high frequency amplifiers, such as used in television systems, it is necessary to compensate for phase shift in the amplifier due to transit time of electrons.

If the phase shift within the amplifier is proportional to frequency, then the output voltage will be a faithful copy of the input voltage but will be delayed or advanced in time by a constant amount for all frequencies. Now, when it is desired to feed back a portion of the output voltage to the input, in order to modify the characteristics of the amplifier, then a difference of time between the two voltages obviously cannot be permitted. Steps must therefore be taken to reduce this time difference to a negligible amount.

Electron transit time effects within a valve give rise to a time delay or negative phase shift which may amount to as much as 15° at 10 megacycles per second or 70° at 45 megacycles per second. In order to counteract this effect it is necessary to advance the phase by an equal amount. The negative phase shift is proportional to frequency, consequently the compensating positive phase shift must also be proportional to frequency.

The circuits and description which follow are the outcome of experimental and analytical work carried out on a 10 mc./sec. two valve "impedance inverting" arrangement which enables feedback to be applied at very high frequencies over a wider band width than was hitherto possible.

Two distinct methods can be used. These will be further explained with reference to Figure 20 which represents two valves V1 and V2 of an amplifier, coupled by means of the impedance $Z_1$. The following discussion is concerned with the phase of $i_2$ with respect to $e_1$. The two methods which can be adopted in order to advance the phase of $i_2$ with respect to $e_1$ are therefore as follows:

(i) The phase of $i_1$ can be advanced with respect to $e_1$ and/or the phase of $i_2$ can be advanced with respect to $e_2$.

(ii) The phase of $e_2$ can be advanced with respect to $i_1$.

Firstly methods will be considered for advancing the phase of the anode current of a valve with respect to the voltage applied in the grid circuit.

In the diagrammatic arrangement shown in Figure 21 let $e$ be the voltage applied in the grid circuit of a valve V, Z an impedance through which the anode current can pass but in such a way that the voltage $e$ is not effected, and $e_g$ the resulting voltage between grid and cathode of the valve.

Now
$$e_g = e + i_a Z \quad \text{(IV)}$$

But $i_a = -g e_g$, where $g$ = mutual conductance of valve.

Therefore
$$e_g = \frac{-i_a}{g}$$

Substituting this in (IV) we have
$$\frac{-i_a}{g} = e + i_a Z$$

Therefore
$$i_a = \frac{-e}{\frac{1}{g} + Z} = \frac{-ge}{1 + gZ}$$

If Z be of the form of a negative inductance
$$Z = -j\omega L$$

Therefore
$$i_a = -ge \cdot \frac{1}{1 - jg\omega L}$$

Thus the anode current is equal to $-ge$ (the value it would have if Z were not present) multiplied by the phase advancing term
$$\frac{1}{1 - jg\omega L}$$

This arrangement therefore produces the right result and provided the angles are not too great the change in amplitude can be neglected.

Figures 22 to 25 show practical arrangements for producing this result. Figure 22 is a simple back-coupling with a negative mutual, represented by the reference $-M$. Figure 23 is similar to Figure 22 but with a split winding and a neutralising condenser $Cn$ to prevent direct coupling between the anode load and the grid circuit via the stray capacity $Cs$. Figure 24 illustrates a "voltage" feedback arrangement wherein feedback is effected through the small condenser $Cf$. This type of feedback is dependent upon the impedance of the anode load, but can be applied very successfully in certain cases. The arrangement of Figure 25 is similar to that of Figure 22 except that the screen current is fed back instead of the anode current.

The required result is obtained if a negative inductance be included in the cathode lead. Similarly for narrow band widths a simple condenser (shunted by means of a suitable resistance or inductance to carry the D. C. component) in series with the cathode lead produces a positive phase shift in the anode current, with respect to the applied grid voltage.

Figure 26 shows one way of obtaining the effect of a negative inductance in the cathode lead.

Considering now the second method and referring to Figure 20 this second method consists in advancing the phase of $e_2$ with respect to the previous anode current $i_1$.

In many cases the coupling impedance $Z_1$ of Figure 20 would be a damped parallel circuit. If this circuit be arranged as shown in Figure 27 then it can be written:
$$e_2 = i_1 \frac{(r + Z_2) Z_3}{r + Z_2 + Z_3}$$

But
$$r + Z_2 + Z_3 = r(1 + jK)$$

Where
$$K = \frac{2Q \Delta f}{f}$$

and
$$Z_2 = -j\frac{1}{\omega C}$$
$$Z_3 = j\omega L$$

Therefore
$$e_2 = i_1 \cdot \frac{j\omega L \left( r - j\frac{1}{\omega C} \right)}{r(1 + jk)}$$

$$= i_1 \cdot \frac{j\omega L r + \frac{L}{C}}{r(1 + jK)}$$

$$= i_1 \frac{L}{Cr} \cdot \frac{(1 + j\omega Cr)}{1 + jK}$$

$$= L i_1 \frac{R}{1 + jK}(1 + j\omega Cr)$$

Thus the circuit is equivalent to an ordinary parallel circuit of resonant impedance R multiplied by a phase advancing term $(1 + j\omega Cr)$. For the large values of damping resistance used in television circuit, the term $(1 + j\omega Cr)$ can be made to produce ample phase shift.

By using the circuit of Figure 28 for $Z_1$ of Figure 20 the phase shift and damping can be controlled independently by controlling the ratio of $r_1$ to $r$.

Other types of complex circuits may be employed. Thus a circuit, which possesses special properties as regards maintaining an input impedance which fluctuates very slowly over a relatively wide band of frequencies, and at the same time has stray capacities which in the ordinary way vitiate the results, is illustrated in Figure 29. The sign and the value of the mutual inductance M is such that the equivalent circuit is indicated in Figure 30 where the series circuits SI, SII and SIII and the parallel tuned circuits PI, PII and PIII are each tuned to the same frequency and are so proportioned as to obtain the desired impedance conditions.

The circuits of Figures 31 and 32 possess certain conveniences of adjustment and enable the valves which produce the compensation effect to be part of the amplifying chain. Figure 31 produces variable selectivity as the feed back potentiometer P is altered, whilst Figure 32 may be adjusted to obtain high gain with wide band width.

It should be understood that the grids labelled 1 and 3 in both figures can be interchanged, whilst the grid of valve VI in Fig. 32 may, instead of being connected as shown, be connected to the point A.

In Figure 32 the input impedance to bandcoupled circuit III is of inverse nature to that of circuit II thus producing a compensation action which in conjunction with the other circuit actions produces the desired result.

What we claim is:

1. An electric circuit comprising first and second electron discharge tubes, an impedance included in the grid circuit of the first tube, and a second impedance coupling the plate of the first tube to the grid of the second, characterized in that the circuit constants, the impedances and the operating parameters of the tube are so chosen that the coupling impedance between the tubes is reversed and superimposed on and substantially neutralizes the grid circuit impedance of the first tube.

2. A wide band amplifier circuit comprising first and second electron discharge tubes, an impedance included in the grid circuit of the first tube, a second impedance coupling the plate of the first tube to the grid of the second and a capacity coupling the anode of the second tube to the grid of the first, characterised in that the circuit constants, the impedances and the operating parameters of the tubes are so chosen that the coupling impedance between the tubes is reversed and superimposed on and neutralises the grid circuit impedance of the first tube.

3. A wide band amplifier as defined in claim 2 wherein the impedance included in the grid circuit of the first tube is constituted by a parallel tuned circuit and the coupling between the tubes consists of a first resistance in series with a second resistance which latter resistance is shunted by a series circuit comprising a third resistance, a capacity, and an inductance.

4. A wide band amplifier as defined in claim 2 wherein the second coupling impedance consists of a variable resistance in series with a parallel tuned circuit and a piezoelectric crystal in shunt to the tuned circuit.

5. A wide band amplifier circuit as defined in claim 2 wherein means are provided for obtaining negative feed-back.

6. A wide band amplifier circuit as defined in claim 2 wherein the capacity coupling is provided for obtaining feed-back from the output to the input of the amplifier, and wherein means are included in the second impedance for correcting for phase shift due to electron transit time whereby the energy fed back is substantially brought into phase with the input.

7. A band-pass amplifier circuit arrangement comprising first and second electron discharge tubes, the first including at least a control grid and an additional grid, an impedance included in the control grid circuit of the first tube, a second impedance coupling the plate of the first tube to the grid of the second, two series connected impedances included in the plate circuit of the second tube, and a connection from the junction point of the two series connected impedances to said additional grid in the first tube, the arrangement being such that the reversed characteristic of the series connected impedance remote from the anode of the second tube is superimposed on said second impedance to produce a resultant characteristic which corrects the characteristic of the remaining one of the series connected impedances and the impedance in the grid circuit of the first tube.

8. A wide band amplifier circuit as defined in claim 7 wherein means are provided for obtaining negative feed-back.

9. A wide band amplifier circuit as defined in claim 7 wherein means are provided for obtaining feed-back from the output to the input of the amplifier, and wherein means are included in the second impedance for correcting for phase shift due to electron transit time whereby the energy fed back is brought into phase with the input.

10. A vacuum tube circuit comprising first and second tubes, a first network connected to the input of the first tube, a second network coupling the output of the first tube to the input of the second, and means for feeding energy from the output of the second tube to said first network to thereby parallel the self admittance of the first network with an effective impedance proportional to the admittance of the second network but reversed in sign, whereby the admittance characteristic of the first network is altered in accordance with the negative of the admittance of the second network.

11. A vacuum tube circuit as defined in claim 10 including means for advancing the phase of currents traversing said tubes to compensate for the time lag occurring in said tubes.

12. A vacuum tube circuit as defined in claim 10 including negative feed back means associated with at least one tube to render the action thereof less dependent on variation of the transconductance thereof.

13. In a superheterodyne receiver provided with an amplifier of intermediate signal frequencies, an impedance modifying network associated with said amplifier, said network comprising first and second tubes, a first network connected to the input of the first tube, a second network coupling the output of the first tube to the input of the second, and means for feeding energy from the output of the second tube to said first network to thereby parallel the self admittance of the first network with an effective impedance proportional to the admittance of the second network but reversed in sign, whereby the admittance characteristic of the first network is modified in accordance with negative of the admittance of the second network.

NOËL MEYER RUST.
JOSEPH DOUGLAS BRAILSFORD.
ERNEST FREDERICK GOODENOUGH.